(12) United States Patent
Mattison

(10) Patent No.: US 6,252,736 B1
(45) Date of Patent: Jun. 26, 2001

(54) SYSTEM FOR PREVENTING CROSSTALK NOISE IN A DISK DRIVE

(75) Inventor: Rodney A. L. Mattison, Louisville, CO (US)

(73) Assignee: STMicroelectronics N.V. (NL)

( * ) Notice: Subject to any disclaimer, the term of this patent is extended or adjusted under 35 U.S.C. 154(b) by 0 days.

(21) Appl. No.: 09/221,642

(22) Filed: Dec. 28, 1998

(51) Int. Cl.⁷ .................................. G11B 5/02; G11B 5/09
(52) U.S. Cl. .................................. 360/68; 360/46
(58) Field of Search .................... 360/46, 68, 67

(56) References Cited

U.S. PATENT DOCUMENTS

| | | | |
|---|---|---|---|
| 4,970,621 | * 11/1990 | Gailbreath et al. | 360/46 |
| 5,168,395 | * 12/1992 | Klaassen et al. | 360/46 |
| 5,307,214 | * 4/1994 | Kawakami et al. | 360/61 |
| 5,910,861 | * 6/1999 | Ahn | 360/46 |

* cited by examiner

Primary Examiner—Regina Y. Neal
(74) Attorney, Agent, or Firm—Theodore E. Galanthay; Lisa K. Jorgenson; William J. Kubida

(57) ABSTRACT

A system for preventing crosstalk noise in a head of a drive for a reading data from and writing data to a magnetic media. The present invention includes circuitry that applies an intermediate current to a write element after a write operation is complete. The intermediate current causes the magnetic domains of the write element to go from a high energy state to an intermediate energy state before going to a low energy state. This reduces the magnetic pulses emitted from the write element.

13 Claims, 3 Drawing Sheets

SYSTEM FOR PREVENTING CROSSTALK NOISE IN A DISK DRIVE

FIELD OF THE INVENTION

This invention relates to reducing crosstalk noise between a write element and a read element on a head of a drive. More particularly, this invention relates to a system that reduces the emission of magnetic pulses from the write head after a write operation is completed. Still more particularly, this invention relates to a system that gradually reduces the current applied to the write element after a write operation is completed to reduce the magnetic domains of the write element from emitting an electromagnetic pulse.

PROBLEM

A common method for storing data in computer systems is to write the data to a magnetic media such as a tape or a disk. Data is typically stored in the form of a binary string of ones and zeros. The ones and zeros are represented on the magnetic media by different magnetic orientations of material. For example, a one is represented by magnetic material oriented in a first direction and a zero is represented by magnetic material that is oriented in a second direction that is perpendicular to the first direction.

In a computer system, a drive reads and writes data to the magnetic media. The drive contains a head which performs read and write operations as the head passes over the media. In a write operation, a current is applied to a write element in the head. The current causes the magnet domain of the write element to go to a high energy state. The high energy magnetic domain emits a magnetic field that orients the magnetic material in the proper direction to represent the desired bit. When an opposite bit is desired, the direction of the current is reversed to change the magnetic domains of the write element which in turn changes the direction of the orientation of the magnetic material being passed over. Read operations are also performed by the head. In a read operation, the head is passed over the desired magnetic material while a read element detects the magnetic orientation of the material by detecting the magnetic field emitted by the material.

The proximity of the write element and read element in the head can lead to errors in read operations that are performed after a write operation. Errors are caused by a magnetic pulse that is emitted from the write element when the write operation is completed. The magnetic pulse is caused by the magnetic domains of the write element changing from a high energy state to a low energy state. The magnetic pulse is received by the read element and disrupts the detection of magnetic orientations of material in the media. The magnetic pulse from the write element that is received by the read element is known as crosstalk noise. There is a need in the art for a system that reduces crosstalk noise between read and write elements of a drive head.

SOLUTION

The above and other problems are solved and an advance in the art is made by the system for preventing crosstalk noise. The system for preventing crosstalk noise gradually reduces the current applied to a write element over a period of time after a write operation is completed. This allows the magnetic domains of the write element to be reduced gradually which prevents the write element from emitting a magnetic pulse and the read element does not detect any magnetic energy from the write element.

In a preferred embodiment of the system for preventing crosstalk noise, current is applied to the write element of a head in the following manner. Write circuitry generates a write current. The write current is then applied to step circuitry which sums the write current with a step current. The resulting current is then applied to the write element. After the last bit of data is written, the write circuitry continues to apply a current to the step circuitry. However, the step circuitry does not sum the write current and the step current. Instead, the write current alone is applied to the write element and the current applied to the write element is substantially weaker. This allows the magnetic domains of the write elements to change to an intermediate energy state before changing to a low energy state.

One manner by which the step circuitry can prevent the step current from being summed to the write current is by squelching the step current after the write operation is completed. Alternatively, the step current can be gradually reduced by a controller until no step current is being passed to the step circuitry. It is also possible to control the amount of the step current squelched over a period of time to gradually reduce the step current that is summed with the write current.

BRIEF DESCRIPTION OF THE DRAWINGS

The above and other features of a system for preventing crosstalk noise can be understood from reading the detailed description and studying the following drawings.

DETAILED DESCRIPTION

Figure 1:
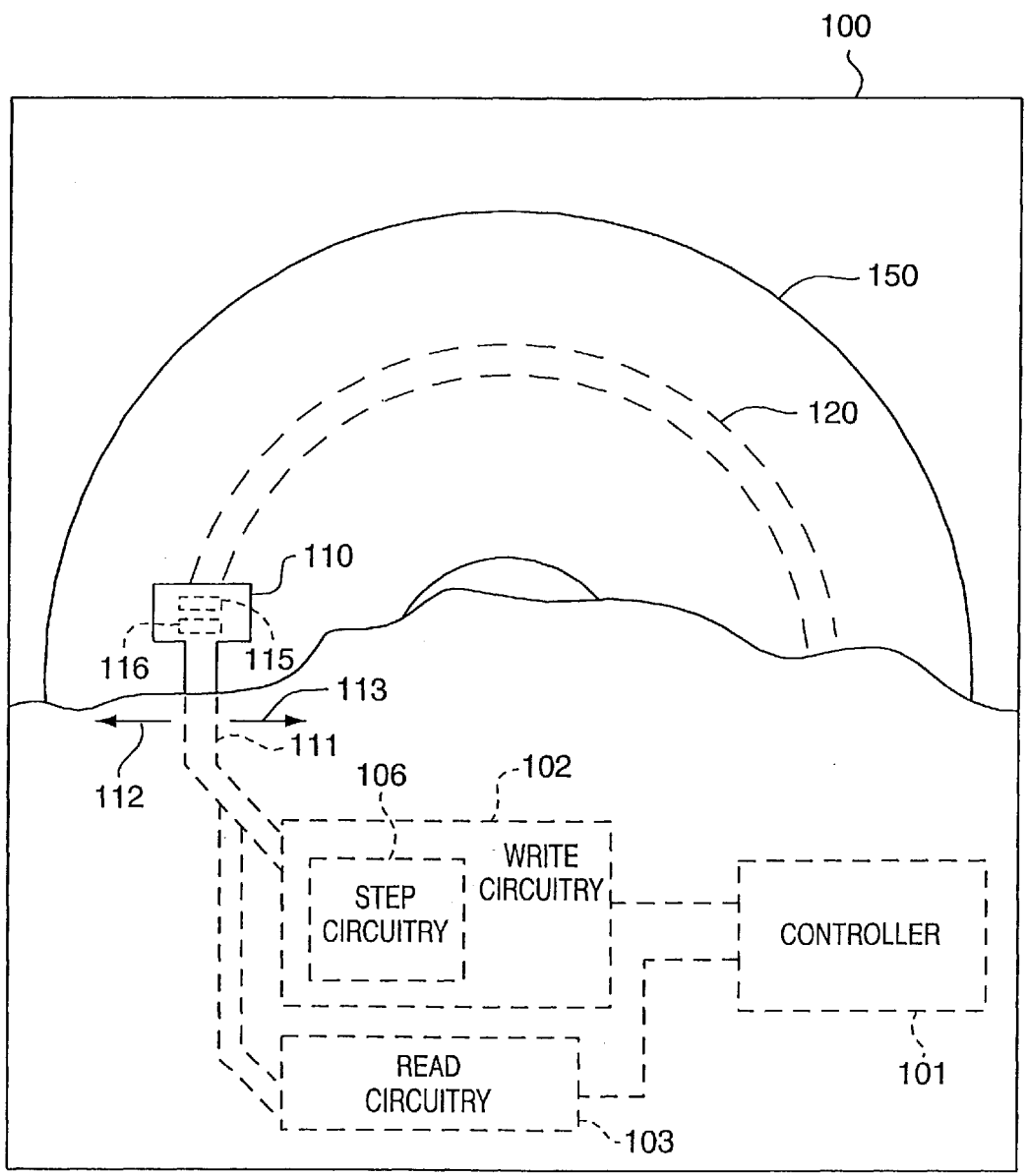
FIG. 1 illustrating a disk drive incorporating the system for preventing crosstalk noise.

FIG. 1 illustrates an example of a disk drive 100 that can incorporate a system for preventing crosstalk noise. Disk drive 100 is a conventional disk drive that can be connected to a computer system (not shown) via bus (not shown). One example of a commonly available disk drive 100 is a Travelstar Disk Drive produced by International Business Machines (IBM) Inc. It should be noted that although the present invention is shown in disk drive 100, it is possible for the system for preventing crosstalk noise to be incorporated into any data device which uses magnetic resistive element to store data on a magnetic media. Another example of such a device is a tape drive that stores data on a magnetic tape.

Disk drive 100 has a disk drive controller 101 that controls the processes of drive 100. Controller 101 is communicatively connected to a rotary motor (not shown) that rotates disk 150 in order to pass disk 150 under head 110. Servo motors (not shown) are connected to arm 111 and to controller 101. The servo motors move arm 111 in direction 112 and 113 to position head 110 over the various tracks 120 of disk 150.

Controller 101 is communicatively connected to write circuitry 102 and read circuitry 103 to perform read and write operations on disk 150. Write circuitry 102 is connected to a write element 115 that writes data to disk 150 and read circuitry 103 is connected to read element 116 that reads data from disk 150. Write circuitry 102 writes data to a track 120 of disk 150 by applying a current to write element 115. The current causes the magnetic domains of the write element 115 to go from a low energy to high energy state. The high energy state magnetic domains impart an orientation on the magnetic material of track 120 to write data. The orientation imparted on the material is determined by the direction of the flow current which is controlled by write circuitry 102.

Data is read from the track 120 of disk 150 in the following manner. Head 110 is placed directly over track 120. Read element 116 then senses the magnetic orientation of the magnetic material and generates a current. The current is then applied to read circuitry 103 which determines the sensed data from the applied current.

Is a problem that crosstalk noise can occur when a read operation is performed after a write operation. Crosstalk noise is an electromagnetic pulse that is generated by write element 115 that is received by the read element 116. The electromagnetic pulse is created when the magnetic domains change rapidly from a high energy sate to a low energy state when current is no longer applied to write element 115. The crosstalk noise can disrupt the detection of magnetic orientation and cause a misread of the data.

Figure 2:
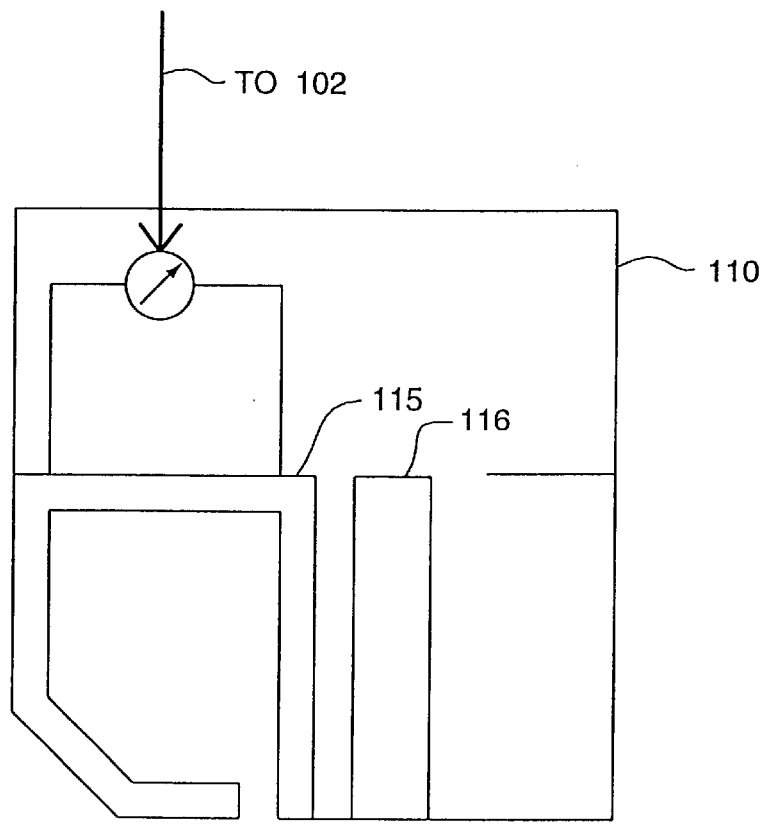
FIG. 2 illustrating a head from the disk drive.

FIG. 2 is a side view of drive head 110. FIG.2 shows the write element 115 is proximate read element 116. Both are positioned on head 110 to be directly over track 120 of disk 150 that passes under head 110, since both write element 115 and read element 116 must be directly over track 120. From this view it is easy to see why crosstalk noise is a problem. The close proximity of write element 115 and read element 116 allows read element 116 to receive any magnetic energy that is emitted by write element 115.

Referring back to FIG. 1, step circuitry 106 reduces crosstalk noise. Step circuitry 106 changes the strength of the current supplied to write element 115 from the high level needed to create a high energy state in the magnetic domains of write element 115 to an intermediate level. The intermediate level allows the magnetic domains to go from the high energy state to an intermediate energy state and finally a low energy state over a period of time. The gradual change from the high energy state to a low energy state prevents an electromagnetic pulse from being generated.

Figure 3:
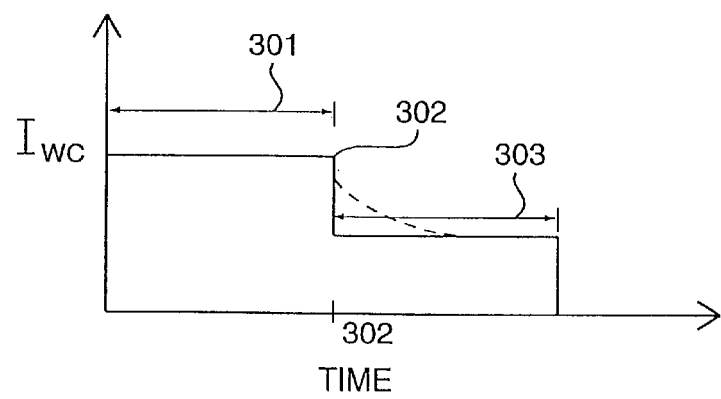
FIG. 3 illustrating a graph of the current applied to the drive head over a period of time.

FIG. 3 is a graph showing the current applied to write element 115 by write circuitry 102 via step circuitry 106. During time period 301, data is being written to track 120 and the current applied to write element 115 must be high demonstrated here by $I_{wc}$ high. At time 302, the data write operation is complete and the current applied to write element 115 is reduced to an intermediate level $I_{wc}$ Intermediate. This can be accomplished in one of several ways. First, as shown by the solid line, the current applied to write element 115 can be reduced to an intermediate level which is applied to write element 115 for time period 303. Alternatively, the current can be reduced to $I_{wc}$ intermediate gradually over time period 303 and then reduced to zero. A third alternative is that the current can be reduced from $I_{wc}$ high to $I_{wc}$ low over time period 303. The basic concept of the invention is that the application of an intermediate level current to write element 115 causes the magnetic domains of write element 115 to reduce to an intermediate level and is applied to write element 130 for time period 303. In order to prevent the magnetic pulse, time period 303 is a predetermined period of time selected in order to reduce the magnetic domains of the write element from a high energy state to an intermediate state and then to a low energy state to avoid creating pulses, and in one embodiment, the time period 303 must last on the order of 1 microsecond. After the intermediate current is applied to write element 115 for a predetermined amount of time, the current is no longer applied to write element 115 and the magnetic domains are allowed to go to a low energy state.

Figure 4:
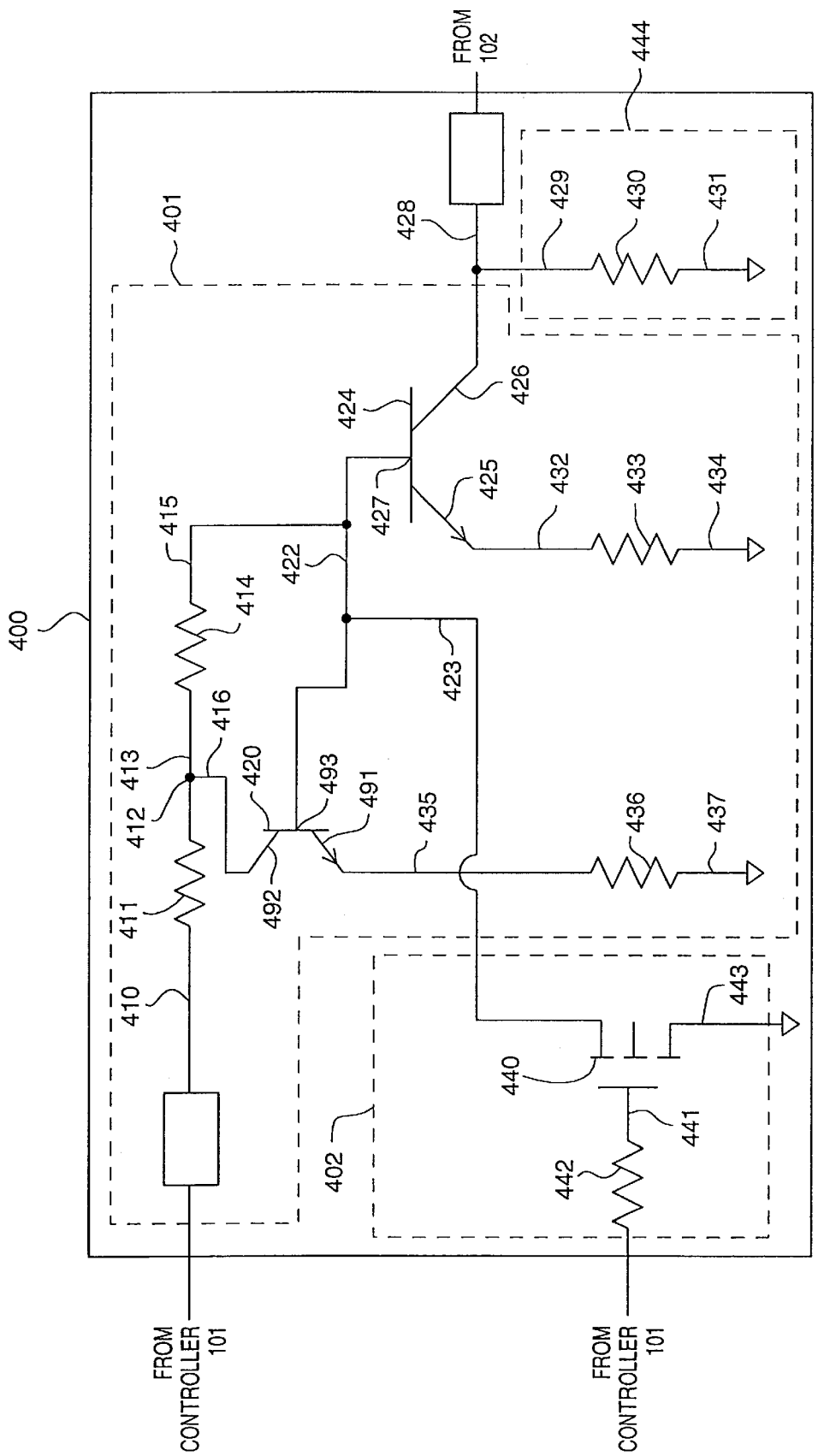
FIG. 4 illustrating step circuitry in a preferred exemplary embodiment of the system for preventing crosstalk noise.

FIG. 4 illustrates a preferred exemplary embodiment 400 of step circuitry 106. However, the present invention is not restricted to this embodiment and other features can be combined in other embodiments to create the present invention. The preferred exemplary embodiment 400 has three basic components: summing circuitry 401, squelching circuitry 402 and back porch circuit 444. Summing circuitry 401 receives a summing current from controller 101 and applies the summing current to back porch circuit 444 during a write operation. Back porch circuit 444 is the circuit that applies current to write element 116. During a write operation, back porch circuit 444 receives the summing current from summing circuitry 401 and a write current from write circuitry 102. The write current and the summing current are summed together to form a high energy current that is applied to write head 115 during a write operation.

After the write operation is complete, squelching circuitry 402 squelches the summing current from summing circuitry 401 and back porch circuit 444 only receives current from write circuitry 102. Since back porch circuit 444 is only receiving current from write circuitry 102, back porch circuit 444 only allows a current of intermediate strength to flow in write element 115. This intermediate current is called a back porch current because it is a step between the high energy state and the low energy state (See FIG. 3).

Summing circuitry 401 operates in the following manner to control the application of a summing current to back porch circuitry 444 over path 428. In a preferred embodiment, the strength of the summing current is dependent upon the magnetic characteristics of write element 115. A control voltage from controller 101 is applied to resistor 411 via path 410. The strength of the control voltage determines the strength of the summing current. The controlling voltage is shared among resistor 411, transistor 420 via path 416, resistor 414 via path 413 and resistor 436 via path 435. The voltage drop across resistor 414 is negligible during a write operation. Resistor 414 is needed to limit the voltage of current applied to squeching circuitry 402 as described below.

Path 416 applies the controlling current to transistor 420. Transistor 420 has an emitter 491, a collector 492, and a base 493. In the preferred embodiment, emitter 491 applies the controlling current to resistor 436 via path 435. Resistor 436 is connected to emitter 491 in order to match the current emitted by transistor 420 and transistor 424. Alternatively, emitter 491 could be connected to ground.

In the circuitry described above, the control current flowing through transistor 420 is determined by the following equation:

$$I_{Q1}=(V_{control}-VBE_{Q1})/R_{411}+R_{436}$$

where:

$V_{control}$=Control voltage;

Q1=transistor 420;

$R_{411}$=resistor 411; and $R_{436}$=resistor 436.

Base 493 reflects the controlling current to transistor 424 via path 422. Transistor 424 has an emitter 425, a collector 426, and a base 427. Transistor 424 mirrors the current applied to transistor 420. The current flowing through transistor 424 becomes the summing current. Therefore, the current flowing through transistor 424 equals the current flowing through transistor 420 ($I_{Q1}=I_{Q2}$). However, the current flowing through transistor 424, the summing current, may be chosen to be unequal to the current flowing through transistor 420, the control current by a determination of the ratio of resistors 433 and 436.

Emitter 425 applies summing current to resistor 433 via path 432. Resistor 433 controls the flow of current from emitter 425. Resistors 433 and 436 are used to match the currents flowing through transistors 420 and 424. Alternatively, it is possible to connect emitter 425 to ground.

Collector 426 applies the summing current to path 428. The write voltage from write circuitry 102 is applied to path 428. Collector 426 and path 429 are joined to form path 428. This causes the summing current and the write current to be summed on path 428. Resistor 430 receives the write voltage applied to path 428 and sets the current flowing through write element 115 by back porch circuit 444. During a write operation, the current applied to write element 115 is the sum of the summing current and back porch current applied to path 428 ($I_{Q2}+I_{write}$) which has a high energy state to drive the magnetic domains of write element 115 to a high energy state. The current in write element 115 is flowing through path 428.

After the write operation is completed, the current being applied to write element 115 must be reduced. In the preferred exemplary embodiment, this is done by squelching the summing current and only applying the current from back porch circuitry 444 to write element 115. The squelching of the summing current is completed by squelching circuitry 402 in the following manner.

Squelching circuitry 402 has a field effect transistor 440 that is connected to base 493 of transistor 420 and base 427 of transistor 424 via path 423. When the write operation is complete, a squelch voltage is applied to field-effect transistor 440 via path 441 by controller 101. The application of the squelch voltage to field-effect transistor 440 causes the drain source impedance of field-effect transistor 440 to go from high to low which squelches the base voltage at bases 493 and 427, causing no mirroring action in transistors 420 and 424. This causes the only current from back porch circuit 444 to flow in write element 115 which is a current of an intermediate level also called the back porch current. Resistor 414 limits the current applied to field-effect transistor 440 to prevent excessive currents in field-effect transistor 440.

The above description describes a system for preventing crosstalk noise in a head of a drive for reading and writing data to a magnetic media. It is expected that those skilled in the art can and will design alternative systems for preventing crosstalk noise that infringe the system of this invention as set forth in the claims below either literally or through the Doctrine of Equivalents.

What is claimed is:

1. A system for reducing electro magnetic pulses in a drive after a write operation comprising:

a write element;

write circuitry adapted for applying a current to said write element to cause magnetic domains of-said write element to be in a high energy state to perform a write operation on a magnetic media of a disk; and step circuitry connected to said write circuitry operable to reduce said current applied to said write element to an intermediate level for a predetermined period of time before stopping the flow of said current to said write element in order to reduce said magnetic domains of said write element from the high energy state to an intermediate energy state then to a low energy state after said predetermined period of time in order to prevent said write element from creating pulses as said write element goes from said high energy state to said low energy state, wherein said predetermined period of time is on the order of 1 microsecond.

2. The system of claim 1 wherein said step circuitry controls a control current that is summed with said current applied to said write element and reduces said current over time after said write operation is completed.

3. A method for preventing a write element in a disk drive from emitting noise to a read element in said disk drive upon completion of a write operation, said method comprising the steps of:

receiving data to write to a magnetic media of a disk;

generating a write current that contains said data, wherein said generating of said write current comprises generating a first write current, generating a step current and summing said step current and said first write current to form said write current to be applied to said write element;

applying said write current to a write element on a head of said disk drive which causes magnetic domains of said write element to change from a low energy state to a high energy state;

passing said write element over said media to write said data to said media;

first reducing said write current applied to said write element to said first write current to prevent said write element from generating magnetic pulses as said magnetic domains change from a high energy state to a low energy state;

holding said write current at said first write current for a period of time on the order of 1 microsecond; and second reducing said write current to a magnitude that places said magnetic domains in said low energy state.

4. A system for reducing electromagnetic pulses in a disk drive after a write operation to a magnetic media of a disk, comprising:

a write element;

write circuitry that applies a current to said write element to cause the magnetic domains of said write element to be in a high energy state to perform the write operation on the magnetic media of the disk; and step circuitry connected to said write circuitry that reduces said current applied to said write element to at least one intermediate level for a period of time on the order of 1 microsecond before stopping the flow of said current to said write element in order to reduce said magnetic domains of said write element from the high energy state to an intermediate energy state then to a low energy state in order to prevent said write element from creating pulses as said write element goes from said high energy state to said low energy state;

wherein said step circuitry comprises:

summing circuitry which receives a control voltage and sums a control current and a back porch current and applies a resulting current to said write element; and squelching circuitry that squelches said control current responsive to said write operation being completed to reduce said resulting current applied to said write element to be said write current received from said write circuitry.

5. The system of claim 4, wherein said summing circuitry comprises:
   a first transistor that receives said control current; and
   a second transistor that receives said control current from a base of said first transistor and applies said control current to a summing path where said control current is summed with said back porch current to form a summed current.

6. The system of claim 5, wherein said summing circuitry further comprises:
   a first resistor that receives said summed current and limits said summed current passing through said first resistor to a current required to cause magnetic domains of said write element to go to a high energy state.

7. The system of claim 5, wherein said summing circuitry further comprises:
   a resistor that receives said control current and limits said control current that is applied to by said resistor to said first transistor.

8. The system of claim 5, wherein said summing circuitry further comprises:
   a first resistor that receives current from an emitter of said first transistor to limit said control current emitted from said first transistor; and
   a second resistor that receives current from an emitter of said second transistor to limit said control current emitted by said second transistor to match said control currents emitted by said first and second transistors.

9. The system of claim 5, wherein said squelch circuitry comprises:
   a field-effect transistor connected to an output of a collector of said first transistor wherein a drain impedance goes from high to low responsive to a current being applied to said field-effect transistor when said write operation is completed.

10. The system of claim 9, wherein said squelch circuitry further comprises:
    a resistor which limits said current that is applied to said field effect transistor.

11. The system of claim 10, wherein said squelch circuitry further comprises:
    a resistor connected a path to an input of said first transistor and an output of said collector of said first transistor that limits the current applied to said field-effect transistor during squelching of said control signal.

12. A method for preventing a write element in a disk drive from emitting noise to a read element in said disk drive upon completion of a write operation, said method comprising the steps of:
    receiving data to write to a magnetic media of a disk;
    generating a write current that contains said data, wherein said generating comprises generating a first write current, generating a step current, and summing said step current and said first write current to form said write current to be applied to said write element;
    applying said write current to a write element on a head of said disk drive which causes said magnetic domains of said write element to change from a low energy state to a high energy state;
    passing said write element over said media to write said data to said media; and
    reducing said write current applied to said write element over a period of time on the order of 1 microsecond to prevent said write element from generating magnetic pulses as said magnetic domains change from a high energy state to a low energy state, wherein said reducing comprises squelching said step current responsive to said writing of data being complete to prevent said step current from being summed with said first write current.

13. The method of claim 12, wherein said reducing includes diminishing the power of said step current responsive to the completion of said writing said data to said magnetic media to reduce said write current resulting from summing said first write current and said step current.

* * * * *